United States Patent
Fodor et al.

(10) Patent No.: US 9,603,177 B2
(45) Date of Patent: Mar. 21, 2017

(54) METHODS AND APPARATUSES FOR ENABLING DIRECT MODE COMMUNICATION BETWEEN USER EQUIPMENTS

(71) Applicant: Telefonaktiebolaget L M Ericsson (publ), Stockholm (SE)

(72) Inventors: Gabor Fodor, Hässelby (SE); Marco Belleschi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 14/442,327

(22) PCT Filed: Nov. 14, 2012

(86) PCT No.: PCT/SE2012/051256
§ 371 (c)(1),
(2) Date: May 12, 2015

(87) PCT Pub. No.: WO2014/077745
PCT Pub. Date: May 22, 2014

(65) Prior Publication Data
US 2015/0341971 A1    Nov. 26, 2015

(51) Int. Cl.
*H04J 3/00* (2006.01)
*H04W 76/02* (2009.01)
(Continued)

(52) U.S. Cl.
CPC ............ *H04W 76/023* (2013.01); *H04L 5/14* (2013.01); *H04W 40/244* (2013.01);
(Continued)

(58) Field of Classification Search
None
See application file for complete search history.

(56) References Cited

U.S. PATENT DOCUMENTS

2010/0165882 A1    7/2010  Palanki et al.
2011/0098043 A1    4/2011  Yu et al.
(Continued)

FOREIGN PATENT DOCUMENTS

| JP | 2012-514435 | 6/2012 |
| WO | WO 2013/172755 | 11/2013 |
| WO | WO 2014/070064 | 5/2014 |

OTHER PUBLICATIONS

International Search Report for International application No. PCT/SE2012/051256, Oct. 31, 2013.
(Continued)

*Primary Examiner* — Otis L Thompson, Jr.
(74) *Attorney, Agent, or Firm* — Baker Botts, LLP

(57) ABSTRACT

A method and apparatus related to a first radio network node serving a first UE in a first mobile radio network for enabling a D2D communication with a second UE served by a second radio network node in a second radio network. The first radio network node establishes a connection with the second radio network node. The first UE (230) requests to the first radio network node to enable a communication with the second user equipment (290). The first radio network sends a first message comprising information related to the first UE (230) to the second radio network node (280) for configuration of the second UE (290). The first radio network node receives a second message for configuration of the first UE (230) and sends to the first UE (230) a third message related to the second UE.

19 Claims, 10 Drawing Sheets

(51) Int. Cl.
*H04L 5/14* (2006.01)
*H04W 56/00* (2009.01)
*H04W 40/24* (2009.01)
*H04W 88/02* (2009.01)
*H04W 92/20* (2009.01)

(52) U.S. Cl.
CPC .......... *H04W 56/001* (2013.01); *H04W 88/02* (2013.01); *H04W 92/20* (2013.01)

(56) References Cited

U.S. PATENT DOCUMENTS

| | | | |
|---|---|---|---|
| 2011/0258327 A1 | 10/2011 | Phan et al. | |
| 2012/0258703 A1* | 10/2012 | Hakola | H04W 4/023 455/422.1 |
| 2012/0258706 A1* | 10/2012 | Yu | H04W 56/0045 455/426.1 |
| 2013/0242866 A1* | 9/2013 | Lin | H04W 76/023 370/328 |
| 2014/0004867 A1* | 1/2014 | Noh | H04W 76/023 455/450 |
| 2014/0204847 A1* | 7/2014 | Belleschi | H04W 76/023 370/329 |
| 2014/0226629 A1* | 8/2014 | Kim | H04W 36/0016 370/331 |
| 2015/0009915 A1* | 1/2015 | Baek | H04W 36/00 370/329 |
| 2015/0181546 A1* | 6/2015 | Freda | H04W 56/0015 370/336 |
| 2015/0237616 A1* | 8/2015 | Morita | H04W 72/048 455/522 |
| 2015/0271859 A1* | 9/2015 | Huang | H04W 72/12 370/329 |

OTHER PUBLICATIONS

Design Aspects of Network Assisted Device-to-Device Communications by Fodor et al., 2011.
PCT Written Opinion of the International Searching Authority for International application No. PCT/SE2012/051256, Oct. 31, 2013.
Advances in D2D Communications: Energy efficient Service and Device Discovery Radio by Klaus Doppler et al.; Nokia Research Center, 2011.
Design Aspects of Network Assisted Device-to-Device Communications by Gabor Fodor et al., Mar. 2012.
Topics in Radio Communications; Device-to-Device Communication as an Underlay to LTE-Advanced Networks by Klaus Dopler et al., Dec. 2009.
3GPP TS 23.401 V13.3.0; Technical Specification; 3rd Generation Partnership Project; Technical Specification Group Services and System Aspects; General Packet Radio Service GPRS) enhancements for Evolved Universal Terrestrial Radio Access Network (E-UTRAN) access (Release 13), Jun. 2015.
International Workshop on Machine-to-Machine Communications; Performance Analysis of a Distributed Resource Allocation Scheme for D2D Communications by Marco Belleschi et al., 2011.
Ohtsuka Patent Office, Japanese Patent Application 2015-543004, 2 pages, Aug. 8, 2016.

* cited by examiner

METHODS AND APPARATUSES FOR ENABLING DIRECT MODE COMMUNICATION BETWEEN USER EQUIPMENTS

PRIORITY

This nonprovisional application is a U.S. National Stage Filing under 35 U.S.C. §371 of International Patent Application Serial No. PCT/SE2012/051256, filed Nov. 14, 2012, and entitled "METHODS AND APPARATUSES FOR ENABLING DIRECT MODE COMMUNICATION BETWEEN USER EQUIPMENTS."

TECHNICAL FIELD

The present disclosure relates generally to a first user equipment and a first radio network node and methods therein. In particular, it relates to apparatuses and methods for enabling communication between a first user equipment and a second user equipment over a, Device-to-Device, D2D, radio link in mobile radio network.

BACKGROUND

A mobile radio network covers a geographical area which is divided into cell areas, wherein each cell area being generally served by a radio network node. A radio network node may be a Radio Base Station (RBS), also sometimes referred to as e.g. "eNB", "eNodeB", or BTS (Base Transceiver Station) depending on which part of the technology needs to be referred. A radio network node or RBS may provide radio coverage to one or more cells. Further, each radio network node may support different communication technologies e.g. Time Division Duplex, TDD, Frequency Division Duplex, FDD. The radio network nodes communicate with user equipments (UEs) also referred to as mobile stations, mobile terminals, wireless terminals, mobile telephones, cellular telephones or smartphones situated within its radio network cell. Other examples of UEs are laptops, notebooks, tablets, handheld devices. All of those having wireless communication capabilities. In addition, a radio mobile communication may be performed between two or more UEs, two or more radio network nodes or two or more radio network core nodes. All of the above-mentioned pieces form part of a radio mobile network.

When the communication is performed between two user equipments, each of these equipments communicates within a frequency band or channel allocated to one operator in a radio network. The frequency band may be a whole spectrum chunk whilst a channel may be a subset of the spectrum resources of the frequency band used for resource management purposes.

Furthermore, the frequency bands in Long Term Evolution (LTE) may operate in both paired and unpaired spectrum, requiring flexibility in the duplex arrangement.

The 3$^{rd}$ Generation Partnership Project (3GPP) provides LTE and "System Architecture Evolution" (SAE) and defines Evolved Packet System (EPS). EPS consists of the evolved Radio Access Network (EUTRAN) and the Evolved Packet Core (EPC).

In this disclosure, a radio network core node may relate to nodes in the evolved packet core (EPC). These nodes may be Mobility Management Entity (MME), Serving Gateway (SGW), Packet Data Network (PDN) Gateway (PGW) or Home Subscriber Server (HSS) and in the 3GPP LTE, the radio network nodes may be directly connected to one or more network core nodes.

Other radio mobile networks that may be used in this disclosure are e.g. Global System for Mobile Communications (GSM), the GSM-evolved Universal Mobile Telecommunications System (UMTS) and UMTS based on Wideband Code Division Multiple Access (WCDMA) for mobile systems, HSPA, WiMax.

Cell-Connectivity

In terms of 3GPP LTE network, a UE can transmit or receive information from this network by searching and selecting an appropriate serving cell, obtaining basic system information and performing random access. By doing this, a UE can obtain synchronization, system parameters and access to system resources.

Device-to-Device Communication

D2D communication allows exploiting the proximity between D2D-capable user equipments. This involves lower power consumption, lower end-end delays and eventually higher data rates that make D2D technology suitable for bandwidth-demanding services such as video streaming, gaming applications and fast data transfer between devices. In addition, D2D is implicitly tailored for proximity-based social networking services and information broadcasting applications.

There are many aspects where D2D communications may take place and some of them are shown in FIG. 1.

There are those that communicate with licensed spectrum and others with unlicensed spectrum. Various ad hoc and personal area networking technologies utilize unlicensed spectrum bands such as the industrial, scientific and medical bands which are available for short range communications, including Bluetooth and WiFi Direct.

On the other hand, D2D communication with licensed spectrum has only recently been proposed and studied. According to this concept, UEs in the proximity of each other can exchange information over a direct link rather than transmitting and receiving signals through a radio base station (eNB) or radio network node. The problem associated with these techniques is that the UEs need to be situated within a radio cell (here also referred as to a radio network) and cannot cross boundaries into other operator licensed/unlicensed frequency bands. This is because at present there are no available inter-operator licensed/unlicensed frequency bands. Furthermore, the allocation of those frequency bands would require lengthy standardization and regulatory processes.

Establishing a direct D2D communication assisted by a network infrastructure such as 3GPP LTE is possible to improve the utilization of cellular spectrum resources and to reduce the energy consumption of user equipments. The assistance may involve neighboring discovery, resource allocation, power control and mode selection policies. The potential gains of D2D communications are equally attractive in cellular networks operated in paired as well as unpaired frequency bands. In the 3GPP LTE system, for example, the FDD and TDD modes are specified in the same set of specifications for both the UE and the eNB. In other words, the D2D communication based on LTE is generally supported in cellular networks operated in either of the duplexing modes. However, existing logical interfaces e.g. X2 Interface do not allow communication between radio network nodes (eNBs) belonging to different operators or radio networks with different duplexing modes. One solution would be for a UE in a operator or radio network to roam into the neighboring radio network or other operator in order to enable D2D communication with a UE in that network. However national roaming is generally not allowed due to regulatory reasons. In addition, a D2D-capable UE that performs roaming could suffer from limited connection due to the potential high distance from the radio network nodes of other radio networks.

SUMMARY

It is an object of the present technology to address at least some of the problems and issues outlined above. It is possible to achieve these objects and others by using methods and an apparatuses as defined in the attached independent claims.

According to an aspect of embodiments herein, there is provided a method in a first radio network node serving a first user equipment in a first mobile radio network for enabling a Device-to-Device, D2D, communication over a radio link with a second user equipment served by a second radio network node in a second radio network comprises establishing a connection with the second radio network node; receiving a request from the first user equipment for enabling the communication with the second user equipment; sending a first message comprising information related to the first user equipment to the second radio network node to be used by the second radio network node for configuration of the second user equipment in response to the received request and via the established connection; receiving a second message comprising information related to the second user equipment from the second radio network node to be used by the first radio network node for configuration of the first user equipment in response to the first message and via the established connection; sending to the first user equipment a third message comprising the received information related to the second user equipment and a command to transmit a beacon for enabling the communication with the second user equipment.

According to another aspect of the present disclosure, there is provided a method in a first user equipment served by a first radio network node in a first mobile radio network for enabling a Device-to-Device, D2D, communication over a radio link with a second user equipment served by a second radio network node, in a second radio network, the method comprising sending a request to the first radio network node for enabling the communication with the second user equipment; receiving from the first radio network node a first message comprising information related to the second user equipment and a command to send a beacon to the second user equipment in response to the sent request; sending a beacon comprising information related to the first radio network node; receiving from the second user equipment a second message indicating that the second user equipment is capable of engaging in a D2D radio link in response to the sent beacon; synchronizing with the second user equipment upon receiving the second message to initiate the communication.

According to a another aspect of the present disclosure, there is provided a first user equipment served by a first radio network node in a first mobile radio network for enabling a Device-to-Device, D2D over radio link communication with a second user equipment served by a second radio network node in a second mobile radio network comprising a transmitter for sending a request to the first radio network node for enabling the communication with the second user equipment; a receiver for receiving from the first radio network node a first message comprising information related to the second user equipment and a command to send a beacon to the second user equipment in response to the sent request; wherein the transmitter is further sending a beacon comprising information related to the first radio network node; and the receiver is further receiving from the second user equipment a second message indicating that the second user equipment is capable of engaging in a D2D radio link in response to the sent beacon; a synchronizer for synchronizing with the second user equipment upon receiving the second message to initiate the communication.

According to a yet another aspect of the present disclosure, there is provided a first radio network node serving a first user equipment, in a first mobile radio network, for enabling a Device-to-Device, D2D, over radio link communication between the first user equipment and a second user equipment served by a second radio network node in a second radio network, and the first radio network node comprising a processing unit for establishing a connection with the second radio network node; a receiver for receiving a request from the first user equipment for enabling the communication with the second user equipment; a transmitter for sending a first message comprising information related to the first user equipment to the second radio network node to be used by the second radio network node for configuration of the second user equipment in response to the received request and via the established connection; wherein the receiver is further receiving a second message comprising information related to the second user equipment from the second radio network node to be used by the first radio network node for configuration of the first user equipment in response to the first message and via the established connection; and the transmitter is further sending to the first user equipment a third message comprising the received information related to the second user equipment and a command to transmit a beacon for enabling the communication with the second user equipment.

The advantages of establishing a connection between the radio network nodes before a D2D communication between user equipments is enabled, lies in the possibility of allowing a D2D communication across the borders of a radio network cell to a neighboring radio network cell which may have another duplexing mode and/or similar duplexing mode(s).

According to another aspect of embodiments herein, there is provided a computer program product comprising computer readable code means, which when run in one or more processing units, causes the radio network node to perform the procedure according to the method described in the first aspect of embodiments.

According to another aspect of embodiments herein, there is provided a computer program product comprising computer readable code means, which when run in one or more processing units, causes the user equipment to perform the procedure according to the method described in the second aspect of embodiments.

A further advantage with the embodiments herein, is that there is no need for roaming when a user equipment communicates over a D2D radio link with another radio network, avoiding suffering from limited connection due to the potential high distance from the radio network nodes of other radio networks.

BRIEF DESCRIPTION OF DRAWINGS

Embodiments will now be described in more detail with reference to the accompanying drawings, in which.

DETAILED DESCRIPTION

Briefly described, embodiments of a D2D communication between UEs, each in different radio networks with different or same duplexing modes and methods therein are provided hereby. TDD/FDD, FDD/FDD, TDD/TDD are examples of duplexing modes.

Figure 1:
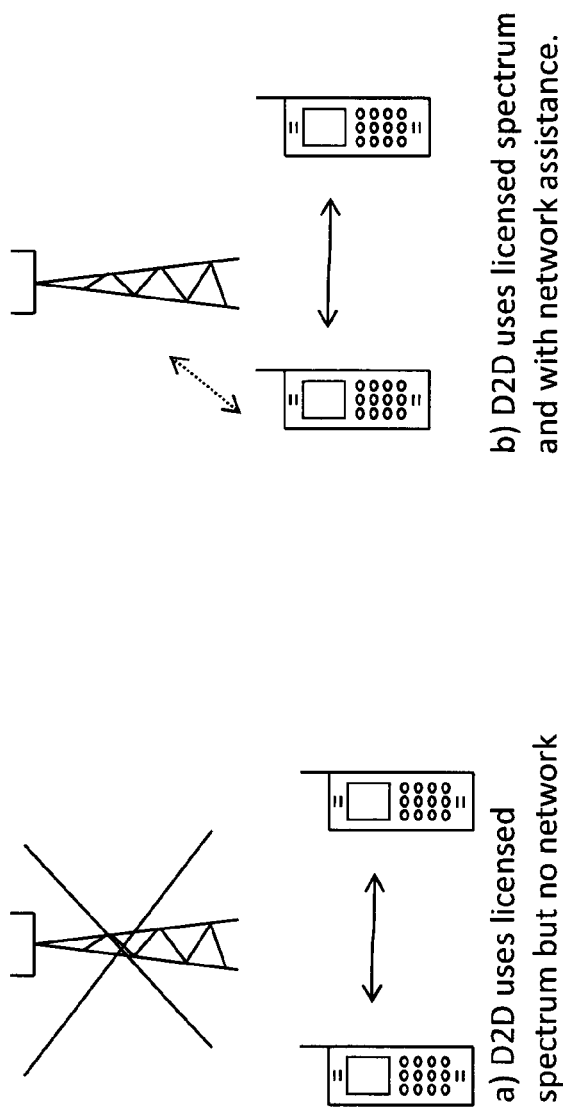
FIG. 1 is illustrating a D2D communication scenario according to the prior art.
Figure 2:
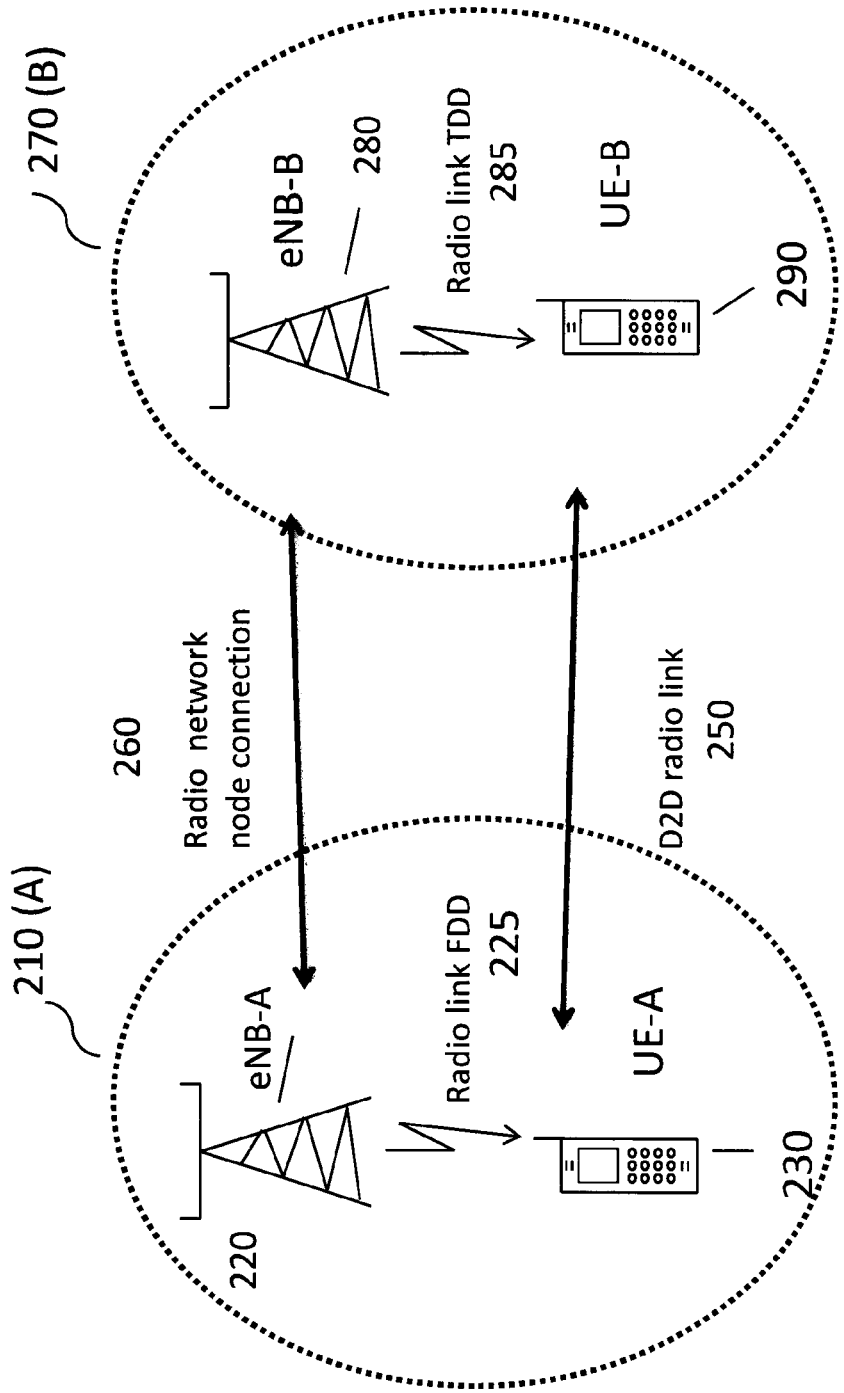
FIG. 2 depicts a D2D communication scenario according to a possible embodiment.

FIG. 2 shows two radio networks 210, 270. Each radio network comprises a radio network node 220, 280, which may be a radio base station, referred here to as an eNB and a respective UE 230,290. In order for a D2D radio link 250 to be established across the borders of a radio network, a radio network node connection 260 is first established between eNBs 220, 280. This is achieved by establishing a logical interface between eNBs 220, 280.

One of the exemplifying embodiments is a method in a first radio network node serving a first user equipment in a first mobile radio network for enabling a Device-to-Device, D2D, communication over a radio link with a second user equipment served by a second radio network node in a second radio network, the method comprising: establishing a connection with the second radio network node; receiving a request from the first user equipment for enabling the communication with the second user equipment; sending a first message comprising information related to the first user equipment to the second radio network node to be used by the second radio network node for configuration of the second user equipment in response to the received request and via the established connection; receiving a second message comprising information related to the second user equipment from the second radio network node to be used by the first radio network node for configuration of the first user equipment in response to the first message and via the established connection; sending to the first user equipment a third message comprising the received information related to the second user equipment and a command to transmit a beacon for enabling the communication with the second user equipment.

The connection established in this method according to an embodiment is described in detail with reference to the scenario and signaling diagram in FIGS. 3 and 4.

Figure 3:
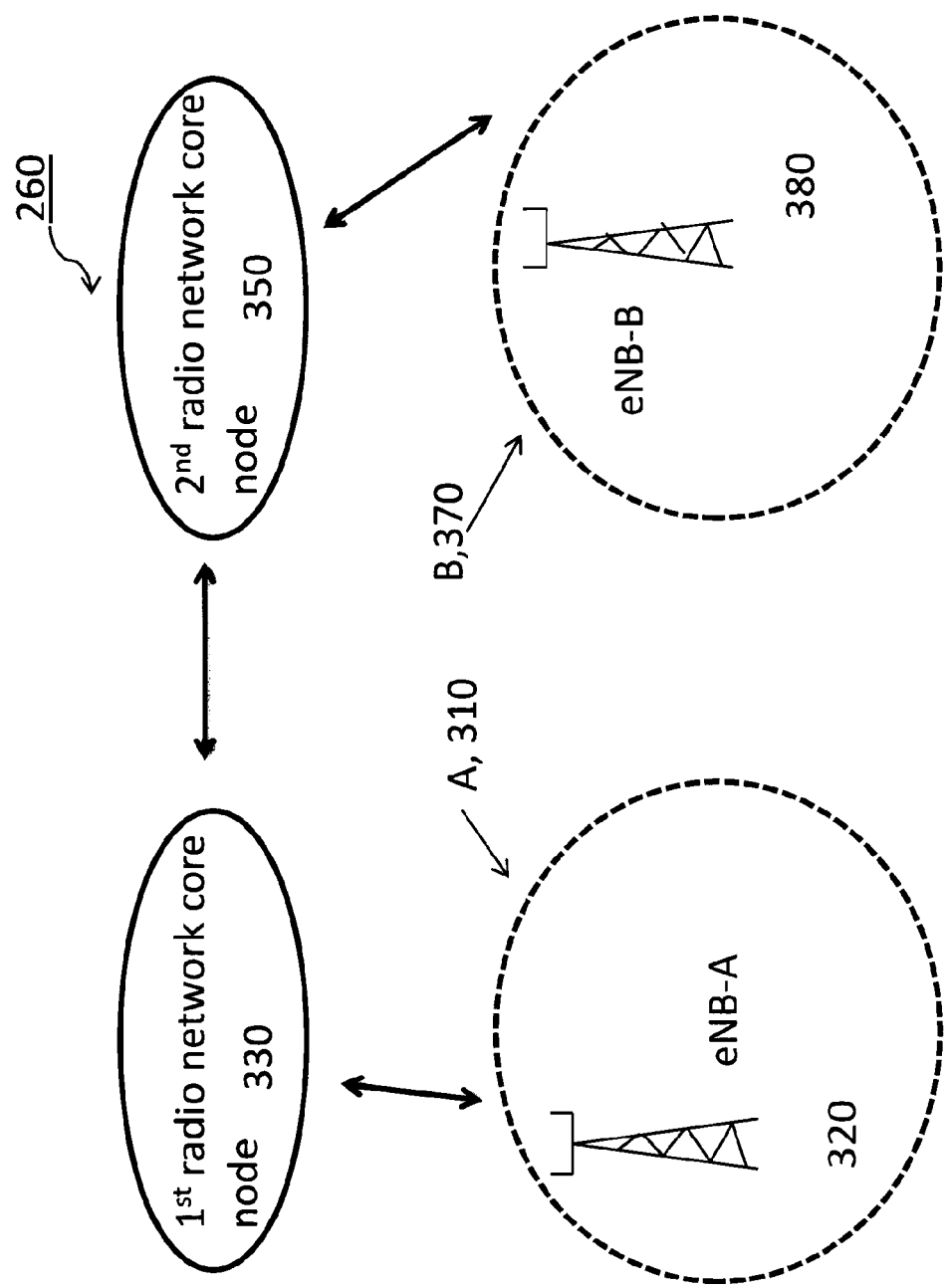
FIG. 3 shows a logical interface in a possible embodiment.

In FIG. 3, it is shown a connection which makes use of a logical interface to exchange information between eNBs. There is a first eNB (hereafter referred to as eNB-A) 320 in a radio network A 310, which first communicates with a first radio network core node 330 which in turn exchanges information with a second network core node 350 connected to a second eNB (hereafter referred to as eNB-B) 380 in a radio network B 370. Each radio network 310,370 may use a different or same duplexing mode 225, 285 (e.g. Time Division Duplex, TDD or Frequency Division Duplex, FDD).

Figure 4:
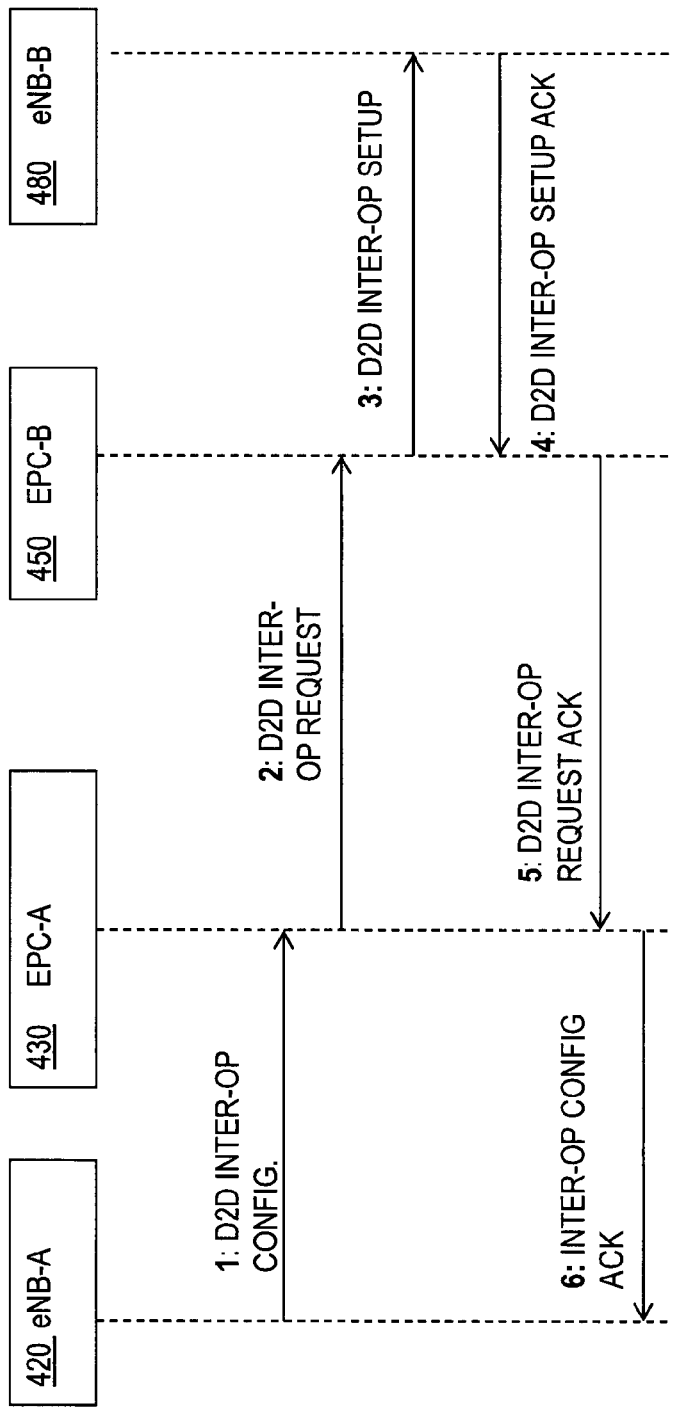
FIG. 4 is a signaling diagram illustrating an example of a procedure when a logical interface is used, according to an embodiment.

As shown in the signaling diagram of FIG. 4, the eNB-A 420 sends a 1: D2D INTER-OP CONFIG message to the first network core node 430 such as EPC-A or MME-A to register those UEs that are involved in D2D traffic and to communicate this information further to the HSS for charging purposes. In e.g. MME-A UEs content ID and/or service ID profile may be registered. This is advantageous when UEs goes in idle mode for example.

The D2D INTER-OP CONFIG message may contain a list of UEs capable of using a D2D radio link over D2D and the type of content or service the UEs are available to share with others. The message further comprises the address of eNB-A 420 and its position. As stated above, along with UEs identity, such information (e.g. service ID and/or content ID) may be stored in the MME-A.

Alternatively, the D2D INTER-OP CONFIG message sent by the eNB-A 420 does not contain the request for an inter-operator connection. The D2D INTER-OP CONFIG message sent by the eNB-A 420 may contain the identity of a specific content and/or service. Upon reception of the D2D INTER-OP CONFIG message, the EPC-A or MME-A is configured to compare the ID of a specific content and/or service contained in the message with the contents and/or services available in the tracking area. In case that such contents and/or services cannot be provided within the tracking area, the EPC-A (orthe MME) may generate a D2D INTER-OP REQUEST message.

Further, the first radio network core node 430, in this case we refer to EPC-A, informs SGW-A (not shown in FIG. 4) about the request of eNB-A 420 through an interface. This interface may be, by way of an example, an S11-interface.

Since SGW-A has a list of neighboring E-UTRAN and EPC that are controlled by other radio networks, SGW-A is able to communicate the address of eNB-A 420 through an interface to the second radio network core node 450 (referred here as to EPC-B). The EPC-B may be a PDNGW-B and the interface may be, by way of example, an S8-interface, which is normally used for the inter-PLMN communication (Public Land Mobile Network).

The EPC-B 450 does not only have the information received by SGW-A related to the address and position of eNB-A, 420 but also the information contains the addresses and Tunnel End-point Information (TEID) of the eNB-B 480 as well as other eNBs controlled by the radio network B. This is shown as a 2: D2 D INTER-OP REQUEST message.

Accordingly, a message 3: D2D INTER-OP SETUP is sent to the eNB-B 480 so the eNB-B 480 is provided with the information needed by eNB-A 420 to establish an IP connectivity with eNB-B 480 as well as with other eNBs in a radio network B.

Upon receiving the message, the eNB-B 480 sends to the EPC-B 450 an acknowledgement 4: D2D INTER-OP SETUP ACK confirming having the needed information.

Alternatively, the D2D INTER-OP SETUP message may be a paging message towards eNBs in the tracking area controlled by EPC-B 450. Such paging message may contain for example the content ID and/or service ID required by eNB-A. Only UEs that are amenable to provide the desired content ID and/or service ID reply to the paging message. Consequently, the D2D inter-operator setup follows the previous statements, i.e. the eNB-B 480 sends to the EPC-B 450 an acknowledgement 4: D2D INTER-OP SETUP ACK message confirming having the needed information. This way UEs in Idle mode maybe be triggered.

On this basis, the EPC-B transmits this information to the EPC-A 430 so the EPC-A 430 is able to provide eNB-A 420 with all information needed to establish an IP connectivity with eNB-B 480. This is shown as a 5: D2D INTER_OP SETUP message and 6: INTER-OPCONFIG ACK message.

Once the connection between the eNBs is established, a communication over a D2D radio link between UE-A and UE-B may be configured. However, it may occur that a request from the UE-A is sent to the eNB-A before a connection between the eNBs is established. In this case, the request may trigger the eNB-A to start an IP-connectivity with eNB-B.

In some cases, the eNB-B may be informed by the EPC-A or MME-A that there are no UEs available in the tracking area to provide a specific type of content/service. Consequently, the EPC-A or MME-A may trigger the setup of an IP-connectivity with eNB-B. For example this may occur for in those cases in which the eNB-A is informed by the MME that there are no UEs available in the tracking area to provide that specific type of content/service ID. As such the MME (or the eNB) may trigger this feature, i.e. the setup of an inter-operator D2D attempt.

Figure 5:
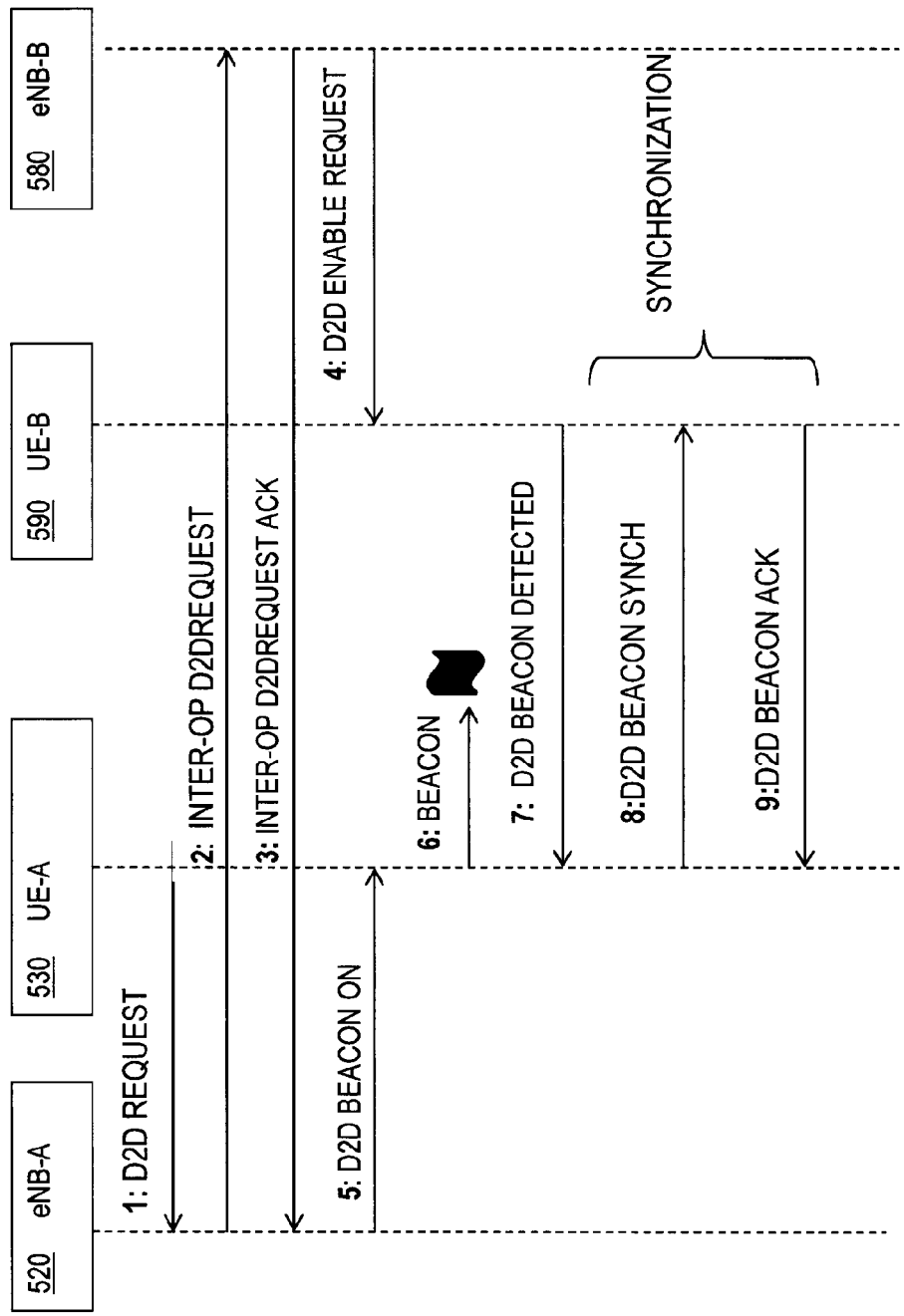
FIG. 5 is a signaling diagram illustrating an example of a procedure when a D2D communication between UEs is established, according to an embodiment.

FIG. 5 shows a signaling diagram describing the steps either after the connection between the eNBs is established or just after a request from the UE to establish a connection with another UE is sent.

The signaling diagram first shows how the UE-A 530 sends a 1: D2DREQUEST message to eNB-A 520 to share any content/service with other UEs that are capable of establishing a D2D-radio link with the UE-A 530. The eNB-A 520 enables D2D discovery within its cell or radio network by searching for D2D-capable UEs and also requests D2D service to neighboring cells potentially served by different radio networks or operators.

The eNB-A 520 further transmits to eNB-B 580 an 2: INTER-OPD2DREQUEST message which contains information about the type of service to share, related information about UE-A 530 (such as C-RNTI, shortMAC-I, position, etc), beacon with Physical Resource Block, PRB, information and information related to radio network A or operator A (e.g. bands and time slots used for D2D communications). The message may further comprise information on one or more PRBs that will be used by UE-A for communicating with the UE-B over a D2D radio link.

The eNB-B 580 receives the message 2 with the provided information and enables a D2D discovery within its cell to select UEs which are able to perform a D2D communication via a D2D radio link. Those selected UEs in the radio network B need also to provide the type of content/service requested by UE-A. In this particular case, eNB-B 580 performs an admission control policy to check whether UE-B 590 can actually be involved in D2D communication, e.g. by checking the amount resources available, the position of UE-A 530 and/or UE-B 590, the subscription plan of UE-B 590, etc.

The eNB-B 580 sends thereafter a 3: INTER-OP_D2D_REQUESTACK message to eNB-A 520 indicating information related to UE-B 590 (e.g. C-RNTI, shortMAC-I, etc) and information related to the radio network B (e.g. frequency bands and time slots used for D2D communications). The 3: InterOP_D2D_RequestACK message may further comprise information about one or more PRBs that are used by UE-B when communicating with UE-A over a D2D-radio link.

In addition, the eNB-B 580 further sends a 4: D2DENABLEREQUEST message to UE-B 590 for indicating the information related to UE-A 530 (e.g. C-RNTI, shortMAC-I, etc), information related to network A or operator A (such as frequency bands, LTE PRB and time slots used for D2D communications), and the command to start listening for beacon messages from UE-A530. The 4: D2DENABLEREQUEST message may further indicate information on one or more PRBs that are used by UE-A 530 when communicating over a D2D-radio link.

The eNB-A 520 sends to the UE-A 530 a 5: D2D BEACON ON message which is a command to start a beacon. The message 5 also indicates one or more PRBs for the beacon. The indicated PRB/PRBs is/are selected according to the received information from the eNB-B 580, which allows the UE-A 530 to send a beacon capable of being listened or detected by the UE-B 590. The 5: D2D BEACON ON may further comprise information on the PRBs that the UE-B will use when enabling a D2D communication. If the UE-A receives this information before sending a beacon, the UE-A may use it to prevent a whole scanning of the frequency band or channel in radio network B and only limit it to the frequency range referred in the PRBs in order to reduce battery consumption.

In response to the message 5: D2D BEACON ON from the eNB-A 520, the UE-A 530 sends to the UE-B 590 a beacon which comprises the PLMN-identity and cell identity of the eNB-A 520, i.e. information on the operative frequency of the eNB-A. The transmission of the beacon is illustrated in FIG. 5 by 6: BEACON. The information comprised in the beacon may further comprise one or more PRBs which the UE-A 530 will use for a D2D transmission. These PRBs normally lie in the frequency band of the radio network A (or radio operator A).

As previously explained, the eNB-B 580 sends to the UE-B 590 a command for listening for a frequency band belonging to the radio network A. When the UE-A 530 sends the beacon message 6, the UE-B 590 decodes it by means of prior art methods. The UE-B 590 further compares the information from the beacon with the information previously sent by the eNB-B 580 related to UE-A 530 in order to uniquely recognize or authenticate UE-A 530 as well as to configure its D2D receiver.

A 7: D2D BEACON DETECTED message is then sent by the UE-B 590 in the frequency band B using the PRB specified in either the 4: D2D ENABLE REQUEST or the 2: INTER-OPD2D REQUEST enabling UE-A to carry out a D2D transmission. The message from the UE-B 590 is then received by the UE-A 530 if it arrives within a limited amount of time. If, after this limited amount of time, the message has not been received by the UE-A 530, the UE-A 530 resends the beacon and the procedure is repeated.

Upon receiving the message from the UE-B 590, the UE-A 530 starts the synchronization with the UE-B 590, since eNB-A 520 and eNB-B 580 are not synchronized since they belong to different radio networks. The synchronization involves for the UE-A 530 to send a D2D Synch-message in the frequency band A back to the UE-B 590 comprising timing correction for transmission to be used in the frequency band B. After UE-B 590 has sent the 7: D2DBEACON DETECTED message, it starts listening, for a limited amount of time, on frequency band A for the 8: D2DSYNCH message sent by the UE-A 530. If the 8: D2DSYNCH message is received, UE-B 590 replies back to the UE-A 530 in the frequency band B with an acknowledgement 9: D2DSYNCHACK that comprising timing correction for transmission to be used in frequency band A. In order to reduce the battery consumption of the user equipments, a solution is to prevent UE-A 530 from scanning the whole frequency band B and consequently preventing UE-B 590 from scanning the whole frequency band A when synchronizing. This is possible when information on PRBs that are used by UE-A 530 and UE-B 590 for enabling a D2D communication are exchanged at an early stage, e.g. in the INTER-OP D2D REQUEST 2 and in the INTER-OP D2D REQUEST ACK 3.

At this stage, when the synchronization is over, the communication over D2D radio link is enabled between UE-A 530 and UE-B 590. Each of the UEs, UE-A 530 and UE-B 590, is transmitting information in the frequency band A and the frequency band B, respectively.

Figure 6:
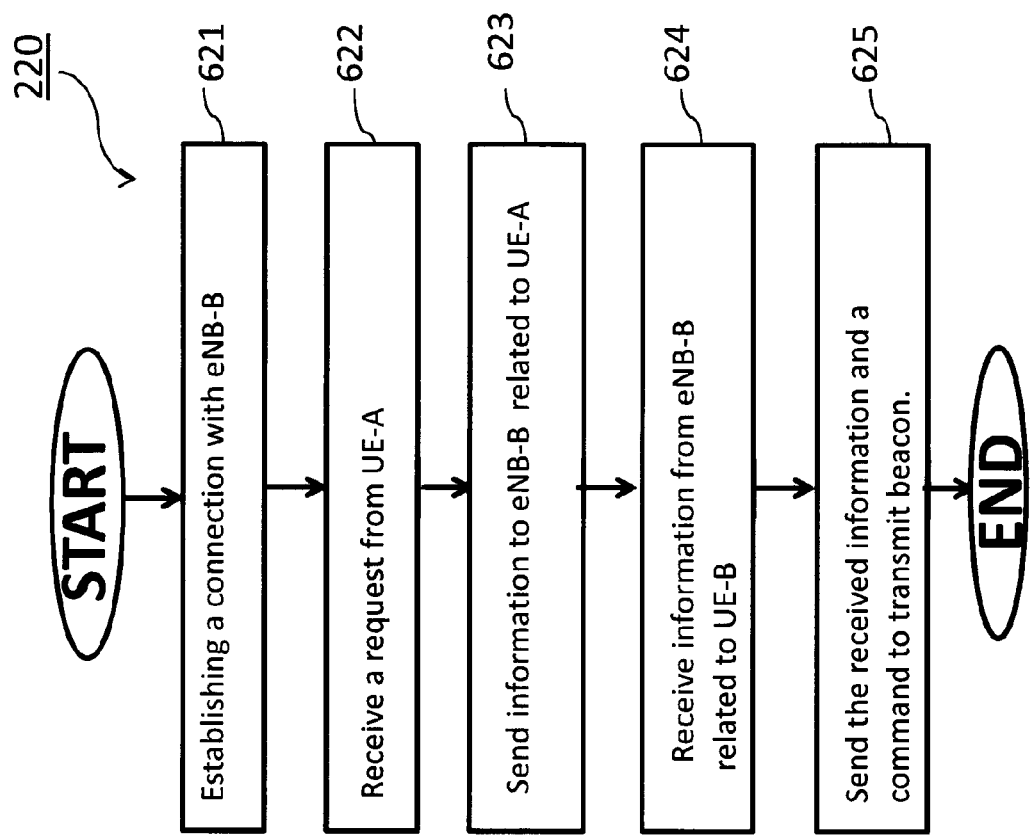
FIG. 6 is a flowchart showing the method steps of a radio network node, according to an embodiment.

According to another embodiment, wherein the method in a radio network node is shown as a flowchart in FIG. 6.

The radio network node, eNB-A 220 which serves a user equipment UE-A in a radio network A, establishes 621 first a connection with another radio network node, eNB-B 280 which serves a user equipment UE-B in a radio network B. This connection may use a logical interface such as shown in FIGS. 3 and 4. The eNB-A receives 622 a request from UE-A to enable a D2D communication over a radio link to UE-B 290. The D2D-radio link may use a hybrid TDD/FDD duplexing. The eNB-A further sends 623 to the eNB-B via the established connection a first message including information related to the UE-A, such as C-RNTI, shortMAC-I, position, information about the type of service and/or content to share, beacon with PRB information and information related to radio network A or operator A (e.g. bands and time slots used for D2D communications). This first message is then received by the eNB-B in which the included information is forwarded to the UE-B for its configuration. The first message may further comprise information on one or more PRBs that is/are used by UE-A for communicating with the UE-B over a D2D radio link. In the case, these PRBs are received by the eNB-B, the eNB-B forwards those to the UE-B for facilitating the synchronization with UE-A.

The next step involves receiving 624 a second message from the eNB-B related to UE-B comprising information such as C-RNTI, shortMAC-I and information related to the radio network B (e.g. frequency bands and time slots used for D2D communications). The second message may further comprise information about one or more PRBs that are used by UE-B when communicating with UE-A over a D2D-radio link.

As a last step, the eNB-A 220 sends 625 a third message to the UE-A comprising the received information from the second message described in the previous step and further sends a command to transmit a beacon capable of being listened or detected by the UE-B 290. The information of this third message is used for configuring UE-A to be enabled for receiving/sending data via a D2D-radio link. The configuration of the D2D radio link comprises setting time and frequency.

Once the beacon is detected by the UE-B and a synchronization between the UEs is carried out, the D2D communication over a radio link is enabled Further, the method in a radio network node wherein the establishing of the connection may comprise sending a first configuration message towards the second radio network node 280 comprising information related to the first radio network node 220 and receiving from the second radio network node 280 a second configuration message comprising information related to the second radio network node 280. Further, the connection to be established according to the provided method/radio network node may use a logical interface.

Further, the method in a radio network node wherein the establishing of the connection 260 may perform in response to the receiving of the request from the first user equipment 230. In certain cases, it may be advantageous to be able to start the procedure of establishing a connection between the radio network nodes with a request from a user equipment because it may avoid further delays in establishing a D2D communication.

In some cases, the radio network node may be informed by the EPC-A or MME-A that there are no UEs available in the tracking area to provide a specific type of content/service. Consequently, the EPC-A or MME-A may trigger the setup of an IP-connectivity with radio network node.

Further, the method in a radio network node wherein the first message and the second message, each may further comprise information on one or more PRBs that are used by UE-A and UE-B respectively.

Figure 7:
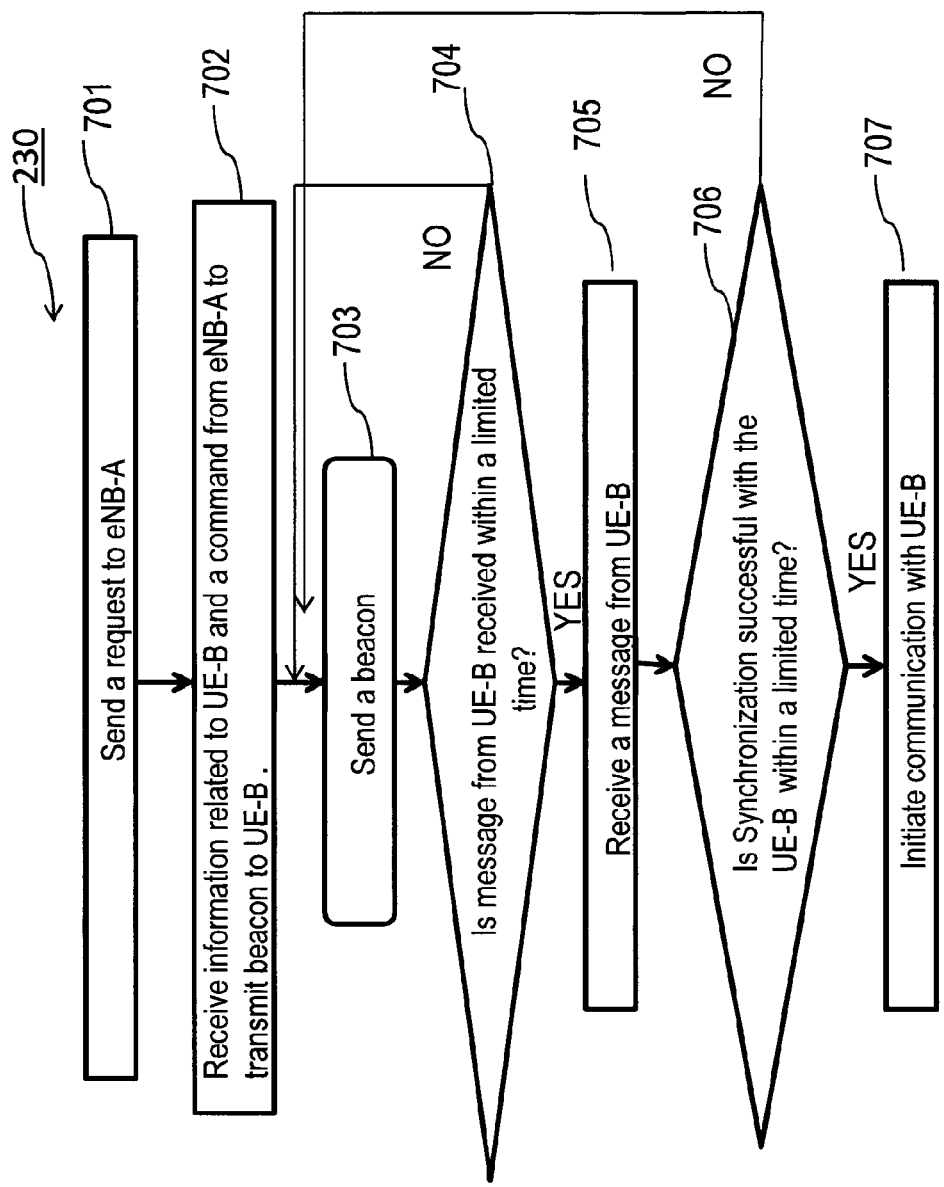
FIG. 7 is a flowchart showing the method steps of a user equipment, according to an embodiment.

According to another exemplifying embodiment is illustrated as a flowchart in FIG. 7, wherein a method in a first user equipment 230 served by a first radio network node 220 in a first mobile radio network 210 for enabling a Device-to-Device, D2D, communication over a radio link 250 with a second user equipment 290 served by a second radio network node 280, in a second radio network 270, the method comprising sending a request to the first radio network node 220 for enabling the communication with the second user equipment 290; receiving from the first radio network node 220 a first message comprising information related to the second user equipment 290 and a command to send a beacon to the second user equipment 290 in response to the sent request; sending a beacon comprising information related to the first radio network node (220); receiving from the second user equipment 290 a second message indicating that the second user equipment 290 is capable of engaging in a D2D radio link in response to the sent beacon; and synchronizing with the second user equipment 290 upon receiving the second message to initiate the communication.

Further, the method in a user equipment wherein synchronizing may comprise receiving a time correction from the second user equipment 290 operating in a second frequency band or channel and sending a time correction to the second user equipment 290 operating in a first frequency band or channel.

Further, the D2D radio link 150 in the method in a user equipment or radio network node may use a hybrid TDD/FDD duplexing. This will allow saving bandwidth and at the same time it will allow the end-user to experience an interference-controlled environment.

In step 701 the UE-A 230 sends a request to eNB-A 220 to share any content/service with other UEs that are capable of establishing a D2D-radio link. In this case UE-A requests to enable a D2D communication to UE-B.

A first message from eNB-A is then received 702 by UE-A related to UE-B comprising information such as C-RNTI, shortMAC-I from the eNB-B and information related to the radio network B (e.g. frequency bands and time slots used for D2D communications). The first message may further comprise information about one or more PRBs that are used by UE-B when communicating with UE-A over a D2D-radio link. These PRBs facilitate the synchronization between the user equipments so the scanning of each frequency band is narrower.

The UE-A further receives a command from the eNB-A to transmit a beacon. In order to transmit the beacon so UE-B can detect it, the UE-A needs information related to UE-B such as the frequency bands or channel of its radio network B for enabling a communication over a D2D-radio link. This information is normally included in the first message.

In step 703, the UE-A sends a beacon as commanded by the eNB-A. The beacon comprises e.g. the PLMN-identity and cell identity of the eNB-A. The information may further comprise one or more PRBs which the UE-A 230 will use for a D2D transmission. If a message from the UE-B is not received within a predetermined time, then the UE-A needs to resend 904 the beacon.

In step 705, the UE-A receives a second message from UE-B indicating that the UE-B is capable of engaging in a D2D radio link.

A synchronization between UE-A and UE-B is then carried out.

For instance, the UE-B starts listening on frequency A for a limited amount of time upon sending to the UE-A the acknowledgement of the beacon. At the same time UE-A starts listening on frequency B for receiving the acknowledgement. As soon as UE-A receives the acknowledgement, the UE-A sends a synchronization message on its own frequency A comprising time correction for transmission on frequency B. As shown in step 706, if the synchronization message is not received within a limited amount of time, the UE-A resends the beacon to UE-B, otherwise the UE-B replies back to the UE-A with a message containing timing correction for transmission on frequency A. This message from UE-B is sent on its own frequency B.

When the synchronization is ready, the communication over D2D radio link with the UE-B can be initiated. The D2D radio link may use hybrid TDD/FDD duplexing.

Figure 8:
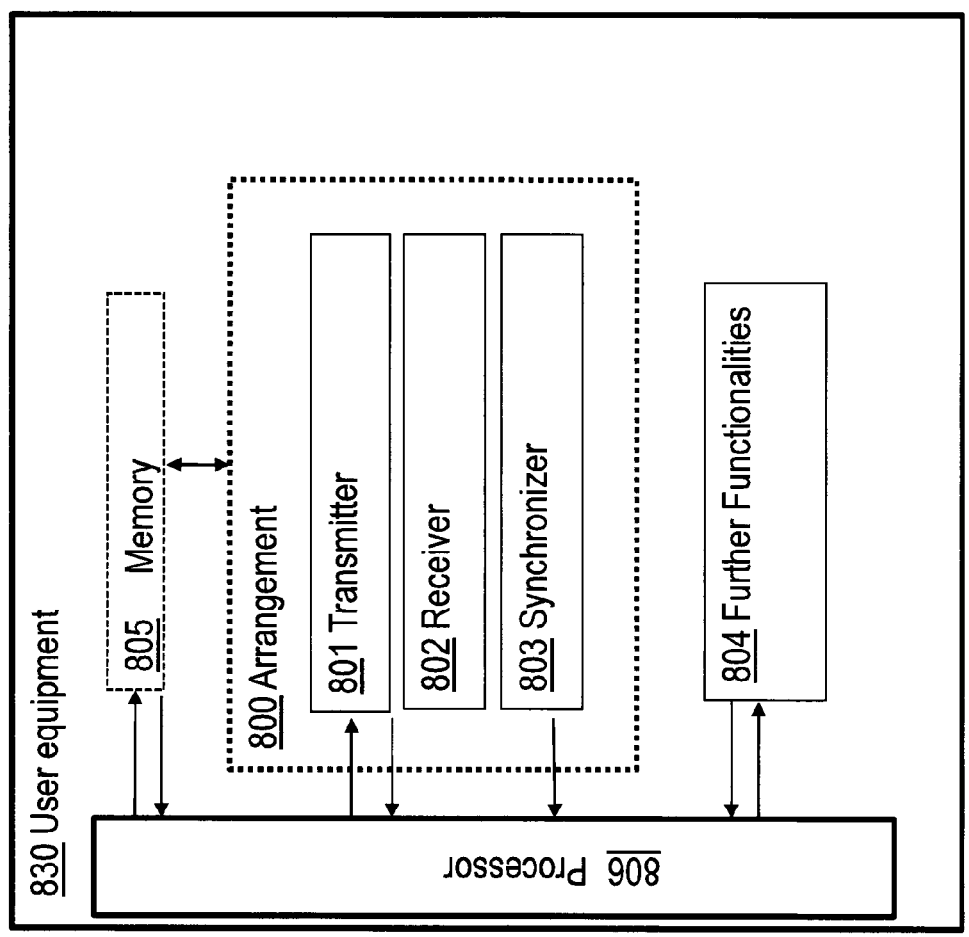
FIG. 8 is a block diagram illustrating a user equipment in more detail, according to further possible embodiments.

In FIG. 8, a block diagram of an example of a user equipment 830 according to an embodiment is depicted. In this embodiment, there is a first user equipment 830 served by a first radio network node 220 in a first mobile radio network 210 for enabling a Device-to-Device, D2D over radio link 250 communication with a second user equipment 290 served by a second radio network node 280 in a second mobile radio network 270 comprising a transmitter for sending a request to the first radio network node 220 for enabling the communication with the second user equipment 290; a receiver for receiving from the first radio network node 220 a first message comprising information related to the second user equipment 290 and a command to send a beacon to the second user equipment 290 in response to the sent request; wherein the transmitter is further sending a beacon comprising information related to the first radio network node 220; and the receiver is further receiving from the second user equipment 290 a second message indicating that the second user equipment 290 is capable of engaging in a D2D radio link in response to the sent beacon; a synchronizer for synchronizing with the second user equipment 290 upon receiving the second message to initiate the communication.

The user equipment 830 comprises a memory 805, a processor 806, an arrangement 800 and further functionalities 804. The arrangement 800 further comprises a transmitter 801, a receiver 802 and a synchronizer 803. All of these parts are adapted to function according to the embodiment and methods described in FIGS. 6 and 7.

Further, the configuration of the D2D radio link in the user equipment may comprise setting time and frequency.

Further, the beacon sent by the user equipment may comprise identification and information on the operative frequency of the first radio network node 120.

Figure 9:
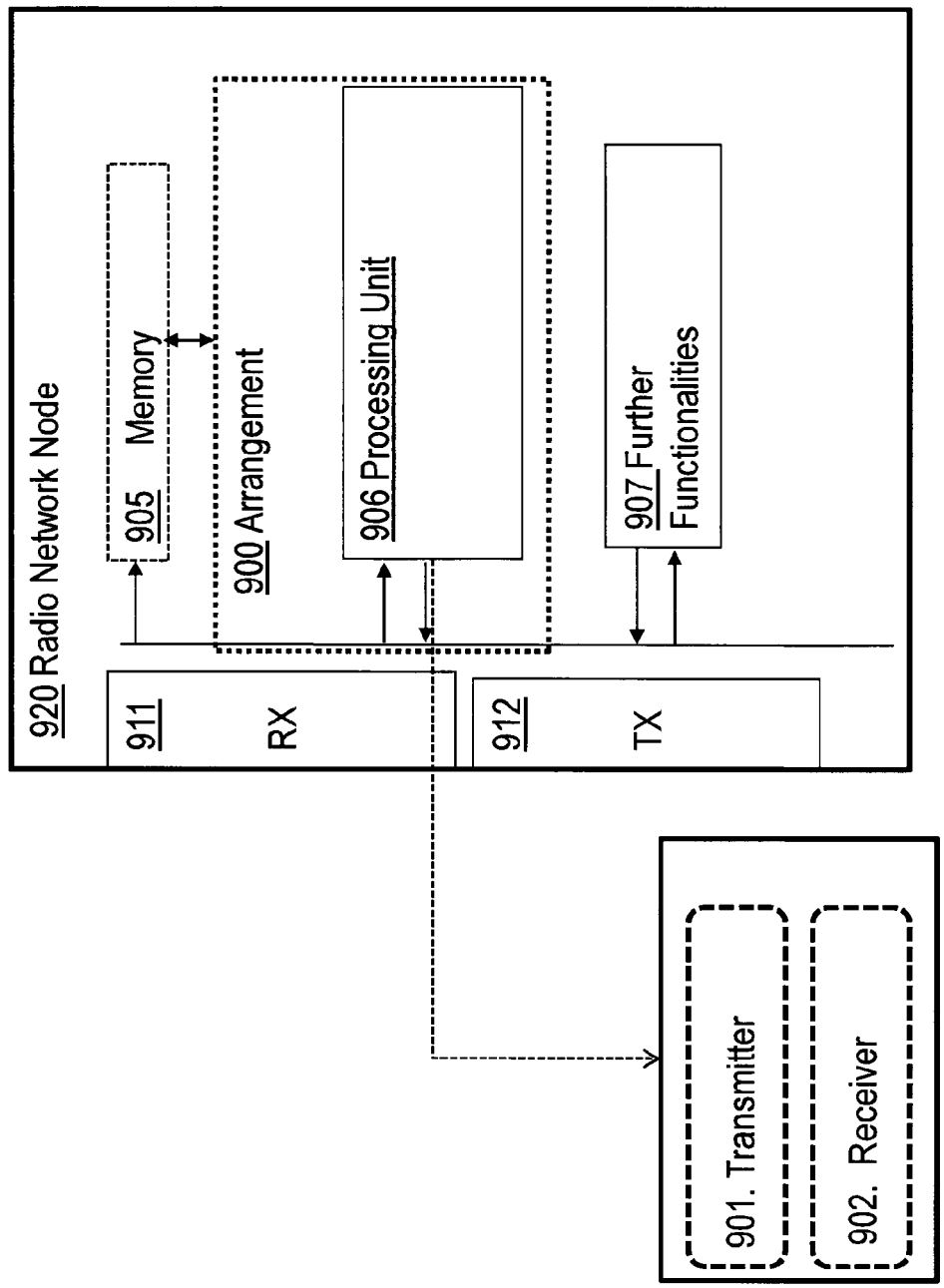
FIG. 9 is a block diagram illustrating a radio network node in more detail, according to further possible embodiments.

FIG. 9 illustrates a block diagram of a radio network node 920 such as a radio base station. The first radio network node 920 serving a first user equipment 230, in a first mobile radio network 210, for enabling a Device-to-Device, D2D, over radio link 250 communication between the first user equipment 230 and a second user equipment 290 served by a second radio network node 280 in a second radio network 270, and the first radio network node 220 comprising a processing unit for establishing a connection 260 with the second radio network node; a receiver for receiving a request from the first user equipment 230 for enabling the communication with the second user equipment 290; a transmitter for sending a first message comprising information related to the first user equipment 230 to the second radio network node 280 to be used by the second radio network node 280 for configuration of the second user equipment 290 in response to the received request and via the established connection 260; wherein the receiver is further receiving a second message comprising information related to the second user equipment 290 from the second radio network node 280 to be used by the first radio network node 220 for configuration of the first user equipment 230 in response to the first message and via the established connection 260; and the transmitter is further sending to the first user equipment 230 a third message comprising the received information related to the second user equipment 290 and a command to transmit a beacon for enabling the communication with the second user equipment 290.

In this exemplifying embodiment, the radio network node 920 comprises a memory 905, a receiver (RX) 911 and a transmitter (TX) 912. In this particular case, the RX 911 and the TX 912 are adapted to function in accordance with the different tasks carried out by the processing unit 906. All of these parts are adapted to function according to the embodiment and methods described in FIGS. 5-6. As seen in FIG. 9, there are further functionalities 907 in this radio network node which will not be described here in further detail, such as antenna, decoder, audio interface, power supply, decoder and encoder to mention some of them. The radio signal transmitted from the radio network node reaches a receiver 902 in a user equipment that may also transmit back a radio link to the radio network node 920 using a transmitter 901 and thereby creating a radio network communication.

Figure 10:
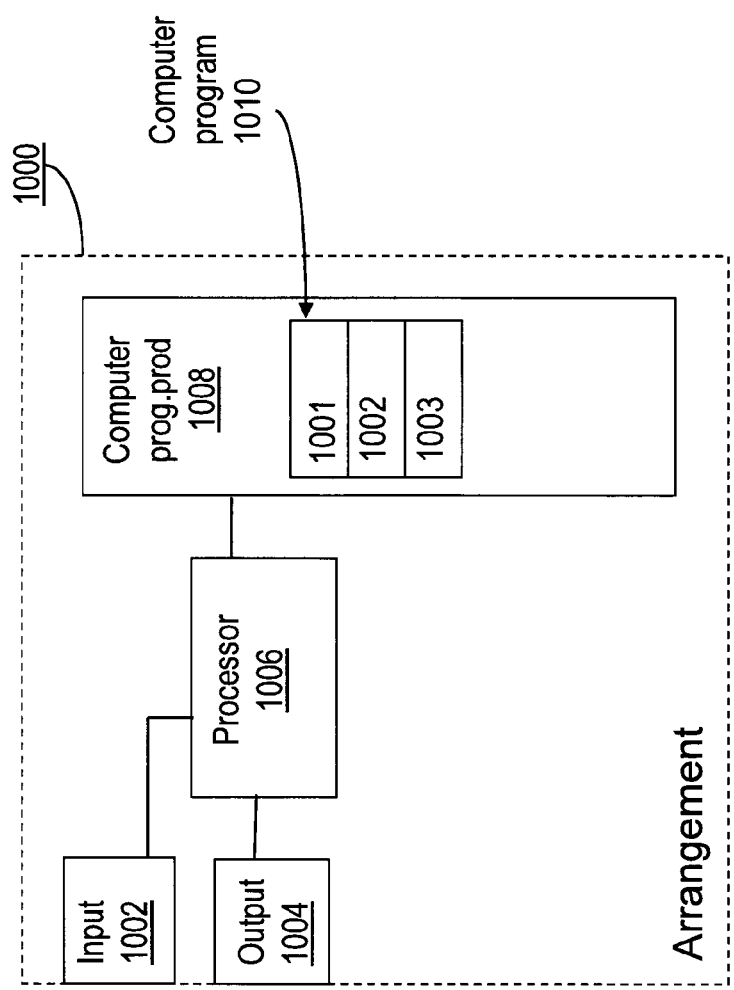
FIG. 10 is a block diagram illustrating a computer program product in more detail, according to further possible embodiments.

FIG. 10 schematically shows an embodiment of an arrangement 1000 in a radio network node, which also can be an alternative way of disclosing e.g. an embodiment of the arrangement 800 in a user equipment illustrated in FIG. 8. Comprised in the arrangement 1000 are here a processor 1006, e.g. with a DSP (Digital Signal Processor). The processor 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a hard drive. The computer program product 1008 comprises a computer program 1010, which comprises readable code means, which when executed in one or more processing units such as the processor 1006 in the arrangement 1000 causes the arrangement and/or the network node to perform the actions e.g. of the procedure described earlier in conjunction with FIG. 8.

The computer program 1010 may be configured as a computer program code structured in computer program modules. Hence, in an exemplifying embodiment, the code means in the computer program 1010 of the arrangement 1000 comprises an identifying a processing module 1001 for establishing a connection 260 with the second radio network node. The computer program further comprises a receiving module 1002 for receiving a request from the first user equipment for enabling the communication with the second user equipment 290. The computer program 1010 further comprises a transmitting module 1003 for sending a first message comprising information related to the first user equipment 230 to the second radio network node 280 for configuration of the second user equipment 290 in response to the received request and via the established connection. The receiving module 1002 of the computer program 1010 further receives a second message comprising information related to the second user equipment 290 from the second radio network node 280 to be used by the first user equipment 230 in response to the first message and via the established connection 260. The transmitting module 1003 further sends to the first user equipment 230 a third message comprising the received information related to the second user equipment 290 and a command to transmit a beacon for enabling the communication with the second user equipment 290. The computer program 1010 further comprises other modules 1004 for providing other desired functionalities.

The modules 1001-1004 could perform the actions of the flowchart illustrated in FIG. 6, to emulate the arrangement in a network node illustrated in FIG. 9. In other words, when the different modules 1001-1004 are executed in the processing unit 1006, they may correspond to the receiver, the transmitter and the processing unit of FIG. 9.

Although the code means in the embodiment disclosed above in conjunction with FIG. 10 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

In a similar manner, an exemplifying embodiment comprising computer program modules could be described for the arrangement in a user equipment illustrated in FIG. 6.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities.

The arrangement 1000 could be implemented e.g. by one or more of: a processor or a micro-processor and adequate software stored in a memory, a Programmable Logic Device (PLD) or other electronic component(s) or processing circuit (s) configured to perform the actions mentioned above.

While the solution has been described with reference to specific exemplary embodiments, the description is generally intended to illustrate the inventive concept and should not be taken as limiting the scope of the solution. For example, the terms "radio network node", "radio network core node", "radio network" and "user equipment" have been used throughout this description, although any other corresponding nodes, functions, and/or parameters could also be used having the features and characteristics described here. The solution is defined by the appended claims.

The invention claimed is:

1. A method in a first radio network node serving a first user equipment in a first mobile radio network for enabling a Device-to-Device, D2D, communication over a radio link with a second user equipment served by a second radio network node in a second radio network, the method comprising:
    establishing a connection with the second radio network node;
    receiving a request from the first user equipment for enabling the communication with the second user equipment;
    sending a first message comprising information related to the first user equipment to the second radio network node to be used by the second radio network node for configuration of the second user equipment in response to the received request and via the established connection;
    receiving a second message comprising information related to the second user equipment from the second radio network node to be used by the first radio network node for configuration of the first user equipment in response to the first message and via the established connection; and
    sending to the first user equipment a third message comprising the received information related to the second user equipment and a command to transmit a beacon for enabling the communication with the second user equipment;
    wherein the first message and the second message each further comprises information on one or more physical resource blocks, PRBs, that are used by the first user equipment and the second user equipment, respectively.

2. The method according to claim 1, wherein establishing the connection comprises sending a first configuration message towards the second radio network node comprising information related to the first radio network node and receiving from the second radio network node a second configuration message comprising information related to the second radio network node.

3. The method according to any of claim 1, wherein the connection makes use of a logical interface.

4. The method according to claim 1, where the establishing of the connection is performed in response to the receiving of the request from the first user equipment.

5. The method according to claim 1, wherein the D2D radio link uses a hybrid TDD/FDD duplexing.

6. A method in a first user equipment served by a first radio network node in a first mobile radio network for enabling a Device-to-Device, D2D, communication over a radio link with a second user equipment served by a second radio network node, in a second radio network, the method comprising:
sending a request to the first radio network node for enabling the communication with the second user equipment;
receiving from the first radio network node a first message comprising information related to the second user equipment and a command to send a beacon to the second user equipment in response to the sent request;
sending a beacon comprising information related to the first radio network node;
receiving from the second user equipment a second message indicating that the second user equipment is capable of engaging in a D2D radio link in response to the sent beacon; and
synchronizing with the second user equipment upon receiving the second message to initiate the communication;
wherein synchronizing comprises receiving a time correction from the second user equipment operating in a second frequency band or channel and sending a time correction to the second user equipment operating in a first frequency band or channel.

7. The method according to claim 6, wherein the D2D radio link uses a hybrid TDD/FDD duplexing.

8. The method according to claim 6, wherein the beacon comprises identification of the first user equipment.

9. The method according to claim 6, wherein the beacon further comprises information on the operative frequency of the first radio network node.

10. A first user equipment served by a first radio network node in a first mobile radio network for enabling a Device-to-Device, D2D over radio link communication with a second user equipment served by a second radio network node in a second mobile radio network comprising:
a transmitter for sending a request to the first radio network node for enabling the communication with the second user equipment;
a receiver for receiving from the first radio network node a first message comprising information related to the second user equipment and a command to send a beacon to the second user equipment in response to the sent request;
wherein the transmitter is further sending a beacon comprising information related to the first radio network node; and
the receiver is further receiving from the second user equipment a second message indicating that the second user equipment is capable of engaging in a D2D radio link in response to the sent beacon;
a synchronizer for synchronizing with the second user equipment upon receiving the second message to initiate the communication, wherein synchronizing comprises receiving a time correction from the second user equipment operating in a second frequency band or channel and sending a time correction to the second user equipment operating in a first frequency band or channel.

11. The first user equipment according to claim 10, wherein the D2D radio link uses a hybrid TDD/FDD duplexing.

12. The first user equipment according to claim 10, wherein the configuration of the D2D radio link comprises setting time and frequency.

13. The first user equipment according to claim 10, wherein the beacon comprises identification of the first user equipment.

14. The first user equipment according to claim 10, wherein the beacon further comprises information on the operative frequency of the first radio network node.

15. A first radio network node serving a first user equipment, in a first mobile radio network, for enabling a Device-to-Device, D2D, over radio link communication between the first user equipment and a second user equipment served by a second radio network node in a second radio network, and the first radio network node comprising:
a processing unit for establishing a connection with the second radio network node;
a receiver for receiving a request from the first user equipment for enabling the communication with the second user equipment;
a transmitter for sending a first message comprising information related to the first user equipment to the second radio network node to be used by the second radio network node for configuration of the second user equipment in response to the received request and via the established connection;
wherein the receiver is further receiving a second message comprising information related to the second user equipment from the second radio network node to be used by the first radio network node for configuration of the first user equipment in response to the first message and via the established connection; and
the transmitter is further sending to the first user equipment a third message comprising the received information related to the second user equipment and a command to transmit a beacon for enabling the communication with the second user equipment;
wherein the first message sent by the transmitter and the second message received by the receiver each further comprises information on one or more physical resource blocks, PRBs, that are used by the first user equipment and the second user equipment, respectively.

16. The first radio network node according to claim 15, where establishing the connection comprises sending a first configuration message towards the second radio network node comprising information related to the first radio network node and receiving from the second radio network node a second configuration message comprising information related to the second radio network node.

17. The first radio network node according to any of the claim 15, wherein the connection makes use of a logical interface.

18. The first radio network node according to claim 15, wherein the establishing of the connection is performed in response to the receiving of the request from the first user equipment.

19. The first radio network node according to claim 15, wherein the D2D radio link uses a hybrid TDD or FDD duplexing.

* * * * *